United States Patent [19]
Brinks et al.

[11] Patent Number: 5,373,726
[45] Date of Patent: Dec. 20, 1994

[54] DETONATION DETECTION SYSTEM FOR INTERNAL COMBUSTION ENGINES

[75] Inventors: Barry T. Brinks, Ft. Collins; Howard F. Farquhar, Loveland, both of Colo.

[73] Assignee: Woodward Governor Company, Rockford, Ill.

[21] Appl. No.: 853,911

[22] Filed: Mar. 19, 1992

[51] Int. Cl.5 .................................. G01L 23/22
[52] U.S. Cl. ............................................. 73/35
[58] Field of Search ............... 73/35 K, 35 KS, 35 P, 73/35 M, 35 I

[56] References Cited

U.S. PATENT DOCUMENTS

| | | | |
|---|---|---|---|
| 4,012,942 | 3/1977 | Harned | 73/35 |
| 4,161,665 | 7/1979 | Buck | 73/35 X |
| 4,233,836 | 11/1980 | Yoneda | 73/35 |

OTHER PUBLICATIONS

Taylor, Charles; *The Internal Combustion Engine in Theory and Practice*, vol. 2, Ch. 2, "Combustion in Spark-Ignition Engines II: Detonation and Preignition," pp. 34-43, 1986.
SAE Technical Paper Series, Takagi, Y. et al., "An Analytical Study on Knocking Heat Release and its Control in a Spark Ignition Engine," No. 880196, pp. 1-10, 1988.
SAE Technical Paper Series, Nakamura, N. et al., "Detection of Higher Frequency Vibration to Improve Knock Controllability," No. 871912, pp. 1-8, 1987.
SAE Technical Paper Series, Carrie, J. et al., "Energy Conservation with Increased Compression Ratio and Electronic Knock Control," No. 790173, pp. 1-9, 1979.
SAE Technical Paper Series, Sawamoto, K. et al., "Individual Cylinder Knock Control by Detecting Cylinder Pressure," No. 871911, pp. 1-5, 1987.
SAE Technical Paper Series, Leppard, W. R., "Individual-Cylinder Knock Occurrence and Intensity in Multicylinder Engines," No. 820074, pp. 1-12, 1982.
SAE Technical Paper Series, Lee, W. et al., "Analysis of Local Pressures, Surface Temperatures and Engine Damages under Knock Conditions," No. 830508, pp. 1-13, 1983.
SAE Technical Paper Series, Dues, S. et al., "Combustion Knock Sensing: Sensor Selection and Application Issues," No. 900488, pp. 93-103, 1990.

*Primary Examiner*—Hezron E. Williams
*Assistant Examiner*—Christine K. Oda
*Attorney, Agent, or Firm*—Leydig, Voit & Mayer, Ltd.

[57] ABSTRACT

A detonation detector operable for detecting the intensity of detonation occurring in a combustion chamber of an internal combustion engine. The detonation detector of the present invention includes a mechanical filter mounted on the engine for amplifying vibration signals resulting from detonation, including low intensity, sub-audible detonation signals. The mechanical filter is tuned to a resonant frequency at about the detonation frequency signal in order to attenuate noise signals from the engine and amplify signals at about the detonation frequency signal. A flat response accelerometer is mounted on the mechanical filter and receives the amplified detonation frequency signals and the attenuated noise signals and converts these signals into electrical output signals. An electronic circuit is connected to the accelerometer for amplifying the electrical output signals and filtering the attenuated noise signals. Thus, the detonation detector provides an output indicative of the intensity level of detonation substantially devoid of noise signals.

31 Claims, 5 Drawing Sheets

DETONATION DETECTION SYSTEM FOR INTERNAL COMBUSTION ENGINES

FIELD OF THE INVENTION

The present invention relates to internal combustion engines, and more particularly, to a system for detecting detonation in combustion chambers of internal combustion engines.

BACKGROUND OF THE INVENTION

Detonation, or combustion knock, has been particularly problematic in reciprocating spark ignited internal combustion engines for many years. In fact, detonation is one of the most studied aspects of the internal combustion engine. In reciprocating spark ignited engines, for example, after spark ignition, a flame travels outward from the spark plug and will progressively burn the entire fuel-air charge in the combustion chamber (cylinder) under normal combustion conditions. The burned gas generates heat and expands, leading to increased temperature and pressure in the unburned gas (end gas) ahead of the flame front. Additionally, cylinder pressure and temperature are increasing due to the upward, compressing motion of the piston in its compression stroke. This may cause the unburned gas to be raised above its autoignition temperature, wherein the unburned gas will spontaneously ignite and burn nearly instantaneously. Thus, if the flame front velocity in the cylinder is low or if the chemical reactions which precede autoignition occur too quickly, the unburned gas will autoignite. This spontaneous combustion results in a very intense pressure wave that is internally reflected within the cylinder wall at a characteristic frequency related to the velocity of sound within the cylinder and the dimensions of the combustion chamber. The flexing of the cylinder wall and cylinder head resulting from this intense pressure wave may produce an audible high-frequency pinging sound known as combustion knock or detonation. The particular fundamental detonation frequency is controlled primarily by the combustion chamber temperature and the cylinder bore diameter. Thus, different engine models or sizes experience detonation at varying characteristic frequencies.

In reciprocating spark ignited internal combustion engines, it is desirable to maintain the spark advance close to the onset of detonation in order to improve fuel efficiency. However, detonation is highly objectionable because of the damage which it causes. For example, in addition to the unwanted sound, detonation can result in erosion of the combustion chamber, damage to spark plug electrodes, exhaust valve damage, or piston ring damage. Thermal damage from detonation is most likely to affect lower melting temperature materials such as aluminum pistons, or parts with poor heat transfer paths to a heat sink such as exhaust valves. Additionally, detonation can induce preignition (i.e., ignition before the spark occurs) which leads to loss of engine efficiency, and rough and unsatisfactory operation. Typically, engines without detonation sensing devices operate with the ignition timing retarded sufficiently to avoid detonation under all expected conditions. This retarded ignition timing results in reduced fuel efficiency. Also, as just explained, engine damage may occur if some unexpected condition causes detonation in an engine with no detonation sensing capability. Accordingly, it is highly desirable to minimize the number and severity of detonations that an engine cylinder is exposed to.

Various factors contribute to the existence of detonation such as engine design parameters and engine operating variables. For example, engine designs that increase the temperature, pressure, and chemical residence time of the end gas increase detonation. Other engine design factors that increase detonation include increased compression ratio, off-center spark plug location, and slow-burn combustion chambers. Additionally, engine operating variables such as spark advance, revolutions per minute, throttle angle, coolant temperature, intake air temperature and humidity, and air/fuel ratio can all have a significant influence on detonation.

Increasingly, use has been made of electronic engine controls with detonation sensors to control the occurrence of detonation. The two most common methods of sensing detonation are monitoring the pressure waves created by detonation, or detecting the resulting vibrations of the cylinder walls due to detonation. Various types of instruments have been developed for detecting pressure waves in the cylinders created by detonation. For example, a pressure transducer or diaphragm can be located in a plug or similar device which is screwed into the cylinder, with the transducer generating an electrical signal as a result of motion of the transducer from pressure waves. In order to provide the electrical signal, the transducer can include a strain-gauge element, a piezoelectric crystal or a magnetic circuit, for example. The electrical signals from the transducer corresponding to the detonation pressure are then transmitted to an engine controller, which takes appropriate action to reduce or eliminate detonation. A significant disadvantage of pressure-type detonation sensors is their location with respect to the engine. The extreme temperatures generated by the engine and the intense pressure fluctuations which these sensors are subjected to significantly affect their reliability. As a result, the use of pressure-type sensors has been very limited.

Currently, the most prevalent type of detonation sensors, such as accelerometers and strain gauges, detect vibrations of the cylinder walls induced by detonation. Accelerometers are sensitive to detonation vibrations and translate these vibrations into electrical signals. Many types of accelerometers exist, and one type often used to detect detonation utilizes a piezoelectric crystal to transform mechanical vibrations into electrical signals. Accelerometers also differ with respect to their resonant frequencies. For instance, spike resonant and broadband resonant accelerometers generally center on the mean detonation signal frequency of the engine, with spike resonant sensors having narrow bandwidths on the order of 100 Hz, and broadband resonant sensors having bandwidths approaching 1000 Hz. These sensors thus utilize their built-in mechanical amplification and filtering characteristics to detect particular detonation signal frequencies. However, because of the relatively narrow bandwidths of these sensors, one sensor is not capable of operating with various engine models and sizes. On the other hand, flat response accelerometers, which have a high resonant frequency and a much wider bandwidth than spike resonant and broadband resonant accelerometers, offer the advantage of commonality since one sensor design can be utilized to detect different detonation signal frequencies for several engine models. In order to distinguish between detonation signals and noise of the engine, however, flat response accelerometers must operate in conjunction with electrical filtering circuitry.

Known detonation detection systems which utilize accelerometers typically mount the accelerometer on the engine block at thinner and less stiff wall areas to detect detonation induced vibrations. In one prior art system, a magnetostrictive accelerometer is used as the detonation sensor, and is mounted on the intake manifold of the engine. The output of the detonation sensor is transmitted to an electronic engine controller, which includes a detonation filter circuit to condition the signal to differentiate detonation signals from normal engine vibrations or background noise. In order to detect the presence of detonation, the electronic controller continuously monitors the background noise of the engine, and then compares the background noise level with the signal from the detonation sensor to determine if detonation is present. If detonation is detected, the controller then produces a retard command to delay or retard the ignition pulse to the spark plug in an attempt to eliminate detonation.

A significant disadvantage with this type of detonation detection system is that the accelerometer is mounted directly on the engine. Similar to pressure-type detonation detectors but to a somewhat lesser extent, the high temperatures generated by the engine can affect the reliability and durability of the accelerometer. Additionally, prior art detonation detection systems which utilize accelerometers experience problems at high engine speeds where the engine generates greater mechanical vibrations, resulting in reduced signal to noise ratios. Similarly, and of great importance, prior art detonation detectors have not been capable of detecting low intensity, sub-audible detonation, since these detectors do not have the capability of adequately distinguishing between low intensity detonation signals and background noise.

SUMMARY OF THE INVENTION

Accordingly, it is a general aim of the present invention to provide a highly reliable detonation detection system capable of detecting low intensity, sub-audible detonation frequency signals.

In accomplishing that aim, it is an object of the present invention to provide a detonation detection system capable of differentiating between low intensity detonation signals and engine noise signals resulting from normal combustion.

In that regard, it is another object of the present invention to provide a detonation detection system capable of providing detonation output signals substantially devoid of noise signals.

It is a related object of the present invention to provide a detonation detection system capable of accurately and consistently providing detonation output signals during periods of increased and random mechanical engine vibrations resulting from high speed engine operation.

It is yet another object of the present invention to provide a detonation detection system being easily adaptable to various sizes and speeds of internal combustion engines with only minor modification.

It is still another object of the present invention to provide a detonation detection system which isolates the detonation detector from high engine temperatures thereby increasing reliability of the detector.

It is a further object of the present invention to provide a detonation detection system capable of monitoring detonation in any number of engine cylinders and providing an accurate calculation of detonation intensity for every firing cycle of every monitored engine cylinder.

It is a feature of the detonation detection system of the present invention that a mechanical filter is tuned to a resonant frequency at about the detonation frequency signal or a harmonic thereof to detect the frequency of vibration signals resulting from detonation.

It is a related feature of the present invention that the mechanical filter comprises a rod assembly which amplifies detonation frequency signals and attenuates noise signals from the engine.

It is another feature of the present invention that an accelerometer is mounted on the rod assembly away from the engine in order to isolate the accelerometer from high temperatures of the engine.

It is yet another feature of the present invention that the detonation detector can utilize a single flat response accelerometer for detecting detonation on various sizes and speeds of engines by simply modifying the construction of the rod assembly.

It is still another feature of the present invention that the detonation detection system provides additional assurance that only detonation signals are detected by actively detecting vibration signals only during the power stroke of the engine or a portion of the power stroke.

In accordance with the present invention, a detonation detector is provided for detecting the intensity of detonation occurring in a combustion chamber of an internal combustion engine. The detonation detector of the present invention includes a mechanical filter mounted on the engine near the combustion chamber for amplifying vibration signals resulting from detonation, including low intensity, sub-audible detonation signals. In the preferred embodiment of the present invention, the mechanical filter comprises a rod assembly which is tuned to a resonant frequency at about the detonation frequency signal in order to amplify signals at about the detonation frequency signal and attenuate noise signals from the engine. A flat response accelerometer is isolated from the engine by being mounted on the mechanical filter and receives the amplified detonation frequency signals and the attenuated noise signals and converts these signals into electrical output signals. The detonation detector also includes an electronic circuit connected to the accelerometer for amplifying the electrical output signals and filtering the attenuated noise signals. Thus, the detonation detector of the present invention provides a detonation output indicative of the intensity level of detonation which is substantially devoid of noise signals.

In another aspect of the present invention, a detonation detection system is provided for detecting the intensity of detonation occurring in one or more combustion chambers of an internal combustion engine for every combustion cycle of the engine. The detonation detection system of the present invention comprises a highly-tuned detonation detector including a mechanical filter mounted near one or more of the combustion chambers for amplifying the frequency of vibration signals resulting from detonation. The detonation detector is operable for differentiating between low intensity detonation signals and engine noise signals. An electronic circuit is connected to the detonation detector to provide further amplification of the detonation signals and to filter engine noise signals. The electronic circuit thus provides filtered detonation signals substantially devoid of engine noise signals. A gated integrator receives the filtered detonation signals from the detonation detector and integrates the filtered signals to provide detonation output signals proportional to the intensity level of the detonation. In order to provide additional assurance that vibration signals unrelated to detonation are not detected, the integrator is activated only during at least a portion of the engine power stroke of the monitored combustion chamber.

DETAILED DESCRIPTION OF THE PREFERRED EMBODIMENTS

While the invention will be described in connection with preferred embodiments, there is no intent to limit the invention to these embodiments. On the contrary, the intent is to cover all alternatives, modifications, and equivalents, included within the spirit and scope of the invention as defined in the appended claims.

Figure 1:
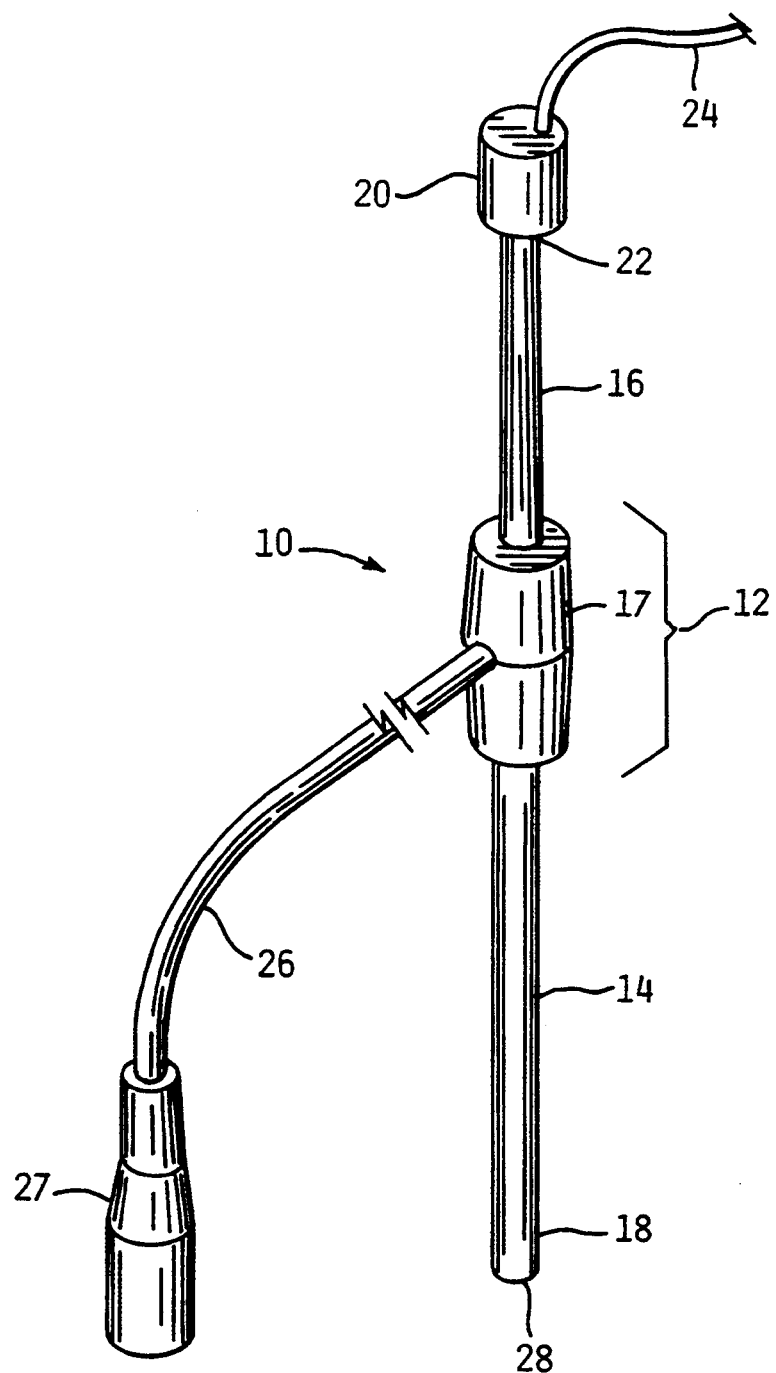
FIG. 1 is a diagram illustrating the preferred embodiment of the detonation detector of the present invention.

Turning now to the drawings, FIG. 1 is a diagram showing a detonation detector 10 in accordance with a preferred embodiment of the present invention. Detonation detector 10 is operable for detecting the intensity of detonation, or combustion knock, occurring in combustion chambers of internal combustion engines, and particularly reciprocating spark ignited internal combustion engines. Detonation detector 10 comprises a rod assembly 12 which includes a metal rod portion 14 and a thermoplastic rod portion 16. Rod portions 14 and 16 are secured to one another with a connector 17. Rod assembly 12 is mountable on an internal combustion engine near a combustion chamber or engine cylinder, with rod assembly 12 having a first end 18 for mounting to the engine. As explained in greater detail below, rod assembly 12 is constructed to be tuned to a resonant frequency at or near the characteristic frequency at which detonation signals occur in the particular engine to which detonation detector 10 is mounted. Thus, rod assembly 12 acts as a mechanical filter which amplifies the frequency of vibration signals resulting from detonation and attenuates or diminishes noise signals from the engine resulting from normal combustion. It should be noted that rod assembly 12 is only a preferred embodiment of a mechanical filter in the detonation detector of the present invention, and the invention should not be limited to this embodiment. On the contrary, the intent is to include any mechanical filtering having a resonant frequency at about the characteristic frequency of detonation for amplifying detonation signals, such as that described below in connection with an alternative embodiment of the present invention. As used herein, the terms "detonation frequency signal" or "detonation signal" should be understood to include both the actual characteristic frequency of detonation signals (typically between 1000 and 8000 Hz) and also higher harmonics of the particular characteristic frequency. Additionally, these terms should not be interpreted as denoting the ignition firing frequency of the engine, which is typically between 3 and 30 Hz.

Detonation detector 10 further comprises an accelerometer 20 mounted on a second end 22 of rod assembly 12. In the preferred embodiment of the present invention, accelerator 20 comprises a flat response accelerometer having a high resonant frequency thus allowing accelerometer 20 to detect a range of characteristic detonation frequency signals. In the preferred embodiment, accelerometer 20 utilizes a piezoelectric crystal contained within the housing of the accelerometer, such as accelerometer Model No. 6062 produced by Columbia Research Laboratories, Inc. In response to mechanical vibrations of the monitored cylinder resulting from detonation, the piezoelectric crystal within accelerometer 20 converts these mechanical vibrations into electrical output signals. However, because rod assembly 12 amplifies the detonation frequency signals and thus provides initial filtering of engine noise signals, the mechanical vibrations detected by accelerometer 20 substantially include detonation frequency signals. Thus, accelerometer 20 receives both the emphasized detonation frequency signals and the attenuated noise signals from rod assembly 12 and converts these signals into electrical output signals.

As explained previously, accelerometer 20 is a flat response accelerometer having a wide bandwidth and capable of detecting a range of detonation frequency signals for various sizes and speeds of internal combustion engines. However, because of the relatively wide bandwidth of flat response accelerometers as compared to spike resonant or broadband accelerometers, accelerometer 20 produces only a relatively low level output signal in response to all vibration frequencies. Thus, detonation detector 10 requires the use of an electronic circuit for amplifying the electrical output signals from accelerometer 20 and for filtering the attenuated noise signals in order to provide an output indicative only of the intensity level of detonation. In FIG. 1, a lead 24 is shown connected from accelerometer 20 to such an electronic filter as explained in greater detail below. It should be noted that because the electrical output signals from accelerometer 20 are at relatively low levels, shielded leads and cable should be used to protect from electromagnetic interference which would disrupt the electric output signals.

Rod assembly 12 of detonation detector 10 also includes a dampener 26 which dampens vibrations of rod assembly 12 in order to prevent rod assembly 12 from continuously resonating from the mechanical vibrations induced by engine operation. As is evident, if rod assembly 12 continuously resonates, it would not be capable of detecting detonation occurring in every combustion cycle of the internal combustion engine. The dampening effect of dampener 26 also diminishes all vibration signals from the engine including both detonation signals and noise signals resulting from normal combustion. However, because rod assembly 12 is tuned to the characteristic detonation frequency signal and thus amplifies detonation signals, the net effect of rod assembly 12 and dampener 26 is to provide an output to accelerometer 20 primarily indicative of detonation signals with noise signals substantially reduced. As seen in FIG. 1, the dampening means 26 comprises a highly insulated spark plug wire which is connectable to an ignition solenoid coil of the engine via a connector 27. Thus, in addition to providing a path for spark ignition to the combustion chamber, the spark plug wire also serves as a dampener to diminish engine noise signals and to dampen vibrations so that the rod assembly 12 does not continuously resonate.

In order to tune rod assembly 12 to a particular characteristic detonation frequency signal, the structure of the rod must be constructed to resonate at this frequency. It is well known that the natural resonant frequency of any mechanical structure is a function of spring rate and mass of the structure. Further, the primary factors for achieving a certain resonant frequency in a mechanical structure are the material of the structure and the length of the structure. In the rod assembly 12 of the present invention, a particular resonant frequency can be attained by manipulating the length of each portion of the rod. Thus, in an exemplary implementation of the preferred embodiment of the present invention, in order to provide a resonant frequency of about 2000 Hz, metal rod portion 14 of rod assembly 12 comprises a 6-inch length of 0.250-inch diameter copper, and thermoplastic portion 16 of rod assembly 12 comprises a 2.688-inch length of 0.250-inch diameter Ryton thermoplastic material. Thus, if a different resonant frequency of rod assembly 12 is desired, all that would be required is manipulation of the lengths of one or both portions of rod assembly 12 until the structure resonates at the chosen frequency. It should be noted that the diameter of rod assembly 12 is also an important factor, since a smaller diameter rod having more flexibility provides a higher peak amplitude at the resonant frequency than a larger diameter rod.

Figure 2A:
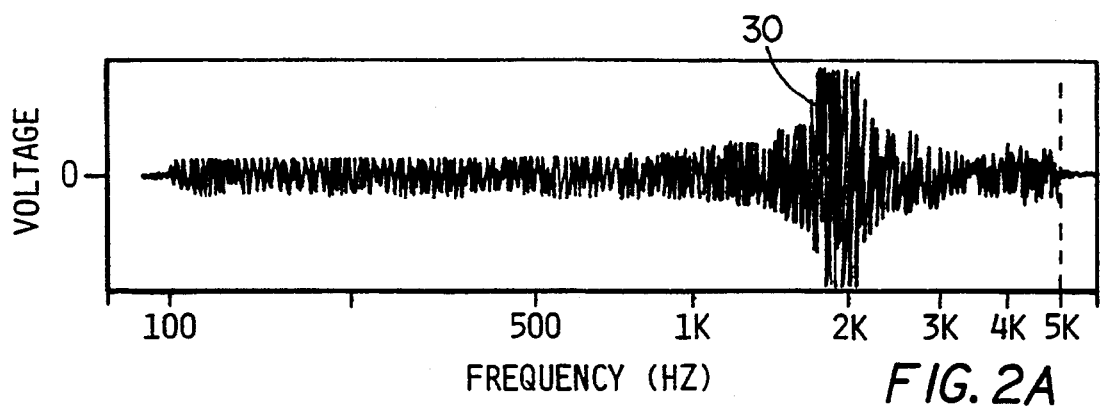
FIGS. 2A-2B are graphs illustrating the voltage outputs of two identical accelerometers as a function of increasing frequency of vibration signals.
Figure 2B:
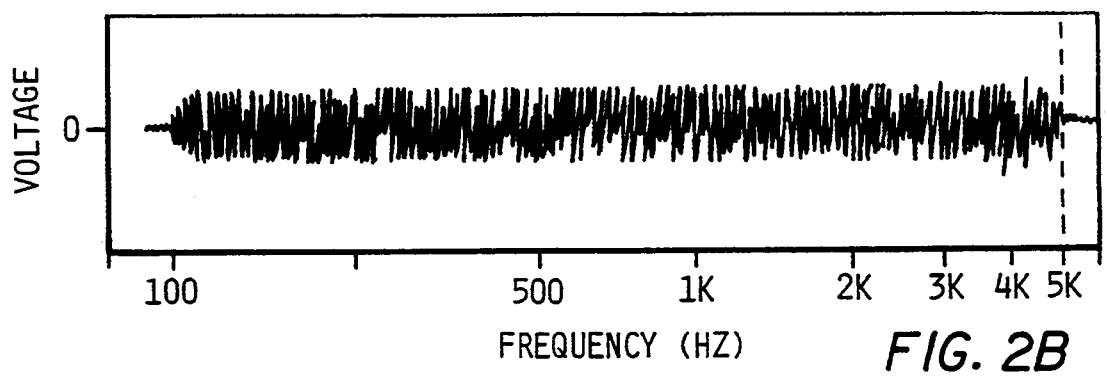

FIGS. 2A-2B are graphs illustrating the voltage outputs of two identical accelerometers as a function of increasing frequency of vibration signals. In FIG. 2A, the accelerometer was mounted on a rod assembly similar to rod assembly 12 of the present invention, with the rod assembly mounted to a vibration testing apparatus which simulated an increasing frequency range of engine vibrations. In FIG. 2B the accelerometer was mounted directly to the vibration testing apparatus without the use of a rod assembly. As can be seen at reference point 30 of FIG. 2A, the amplitude of the output of the accelerometer increases significantly at and around the detonation frequency signal of 2000 Hz. This increased amplitude is achieved by utilizing rod assembly 12, which is constructed to resonant at about the detonation frequency signal of 2000 Hz in the exemplary implementation of the preferred embodiment. Thus, because of the highly-tuned nature of rod assembly 12, rod assembly 12 amplifies the vibration signals resulting from detonation to provide an increased accelerometer output at the detonation signal frequency.

In the preferred embodiment, rod portion 14 includes a threaded opening 28 which allows the detonation detector 10 to be mounted directly on top of a spark plug. It is known that the spark plug is an effective location for detecting vibration signals in combustion chambers resulting from detonation. However, prior art detonation detectors which utilize accelerometers are not capable of locating the sensors directly on a spark plug. In the preferred embodiment of the present invention, metal rod portion 14 serves as an electrical conductor to carry electrical energy such as high voltage spark ignition pulses from the spark plug wire 26 to the spark plug. The thermoplastic rod portion 16 is securely connected to metal rod portion 14 via connector 17, but isolates accelerometer 20 from the high voltage ignition pulses which pass through metal rod portion 14. Additionally, as explained above, spark plug wire 26 not only provides a path for spark ignition to the spark plug, but also dampens vibrations to prevent rod assembly 12 from continuously resonating and to diminish the effects of engine noise signals. Thus, the detonation detector 10 of the present invention provides the advantageous feature of allowing the detector to be mounted directly on a spark plug to measure the vibrations resulting from detonation. However, it should also be understood that detonation detector 10 can be mounted on any location on an engine which is suitable for measuring the vibrations resulting from detonation in a combustion chamber.

In the preferred embodiment described above, detonation detector 10 is primarily intended for use in medium to large spark ignited internal combustion engines on the order of between 30 and 100 liters displacement per cylinder. For example, the detonation detector 10 could be utilized on internal combustion engines used in conjunction with natural gas compressors for underground natural gas pipelines. Alternatively, detonation detector 10 could be utilized on spark-ignited engines used to generate electrical power. However, it should be understood that detonation detector 10 of the present invention is adaptable for use on various sizes and speeds of internal combustion engines, and is not intended to be limited solely to the exemplary embodiment discussed herein.

Detonation detector 10 of the present invention provides several significant advantages over previous detonation detectors. For example, detonation detector 10 is highly operable for detecting low intensity, sub-audible detonation which prior art sensors utilizing flat response accelerometers are not capable of adequately detecting. Detonation detector 10 can detect low intensity, sub-audible detonation levels because rod assembly 12 acts as a mechanical filter to amplify detonation frequency signals and attenuate vibration signals resulting from normal operation of the engine. Thus, rod assembly 12 provides a means for accurately differentiating between low intensity detonation signals and engine noise signals resulting from normal combustion vibrations. This advantageous feature becomes extremely important when it is desired to use a flat response accelerometer, which is the preferred type of accelerometer in detonation detector 10 of the present invention.

As discussed above, because of their high resonant frequency and wide bandwidth, flat response accelerometers are desirable because they are capable of detecting detonation occurring in different sizes and speeds of engines having different characteristic detonation frequency signals. If a broadband or spike resonant accelerometer is utilized, a different accelerometer would be required for each different engine since these accelerometers have relatively narrow bandwidths for detecting detonation signal frequencies as compared to flat response accelerometers. However, detonation detector 10 of the present invention can utilize a single flat response accelerometer operable for detecting a range of detonation frequency signals for different types and sizes of internal combustion engines. In order to detect a detonation frequency signal of a particular engine, the construction of rod assembly 12 is simply modified to achieve a resonant frequency at or near the required characteristic detonation frequency or a desired harmonic of this frequency.

Another advantageous feature of the detonation detector 10 of the present invention is its ability to isolate accelerometer 20 from high temperatures of the engine. As discussed previously, prior art detonation detectors mounted the detonation sensor more directly on the engine, which subjected the sensor to high temperatures of the engine resulting in decreased reliability of the sensors. In contrast, the detonation detector of the present invention isolates accelerometer 20 from the engine by mounting it on rod assembly 12 so that it is not subjected to these high temperatures. As shown in FIG. 1, accelerometer 20 is mounted on the second end 22 of rod assembly 12. Thus, in addition to the features discussed above, detonation detector 10 is more reliable than previous detonation sensors since it is not subjected to high engine temperatures. Additionally, because of the highly tuned nature of rod assembly 12, detonation detector 10 of the present invention is capable of accurately and consistently providing detonation output signals during periods of increased and random mechanical engine vibrations resulting from high speed engine operation.

Figure 3:
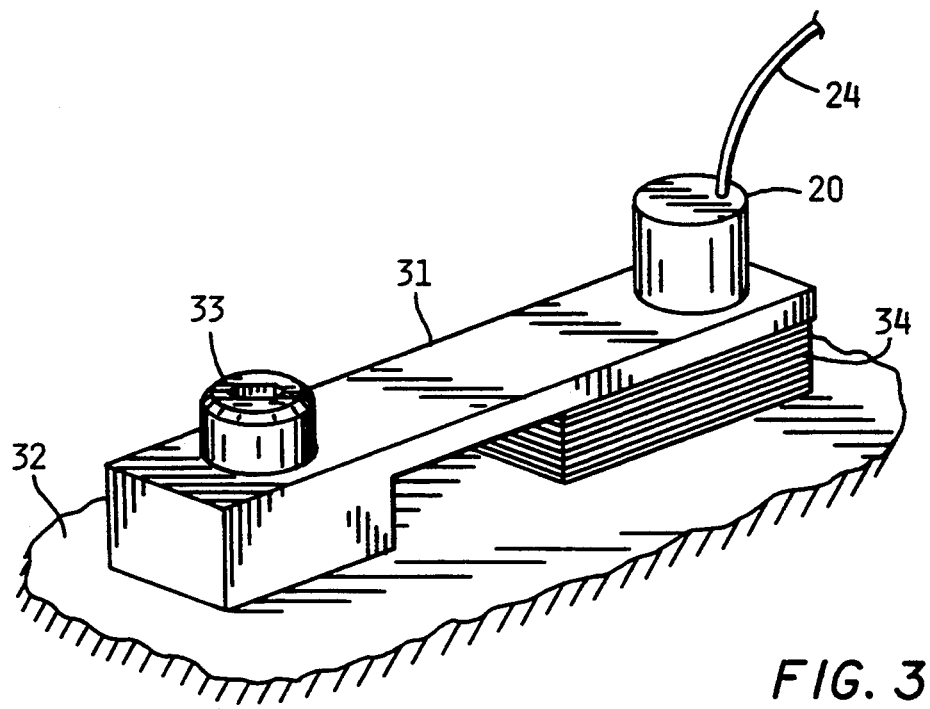
FIG. 3 is a diagram illustrating an alternative embodiment of the detonation detector of the present invention.

FIG. 3 illustrates an alternative embodiment of the detonation detector of the present invention. In this alternative embodiment, the mechanical filter comprises a cantilever beam 31 mounted on an internal combustion engine 32. Cantilever beam 31 is securely mounted to engine 32 with a mounting screw 33. Similar to rod assembly 12 of the preferred embodiment, cantilever beam 31 is tuned to a resonant frequency at about the characteristic detonation frequency signal of engine 32. Thus, cantilever beam 31, which can be constructed of a metallic material such as aluminum, amplifies the detonation frequency signals so that engine noise signals are diminished. Additionally, cantilever beam 31 can be tuned to a different resonant frequency by simply modifying the structural dimensions of beam 31.

In FIG. 3, accelerometer 20 is mounted on cantilever beam 31, and thus receives the amplified detonation signals and engine noise signals and converts these signals into electrical signals. As in the preferred embodiment, these electrical signals are transferred to an electronic circuit via lead 24 for further amplifying and filtering. Additionally, a dampener 34 is connected to beam 31, with dampener 34 disposed between beam 31 and engine 32. Similar to dampener 26 of FIG. 1, dampener 34 prevents beam 31 from continuously resonating due to engine vibrations. Dampener 34, which can be constructed of an elastomeric or foam material for example, also diminishes the effects of engine noise signals.

Thus, the detonation detector of the present invention can utilize any mechanical filtering structure capable of being tuned to a resonant frequency at about the characteristic detonation frequency signal in an internal combustion engine. As explained above, the mechanical filter can comprise a rod assembly, a cantilever beam, a diaphragm, or any other damped mechanical resonating structure which inherently amplifies detonation signals and thus attenuates engine noise signals.

Figures 4A, 5A:
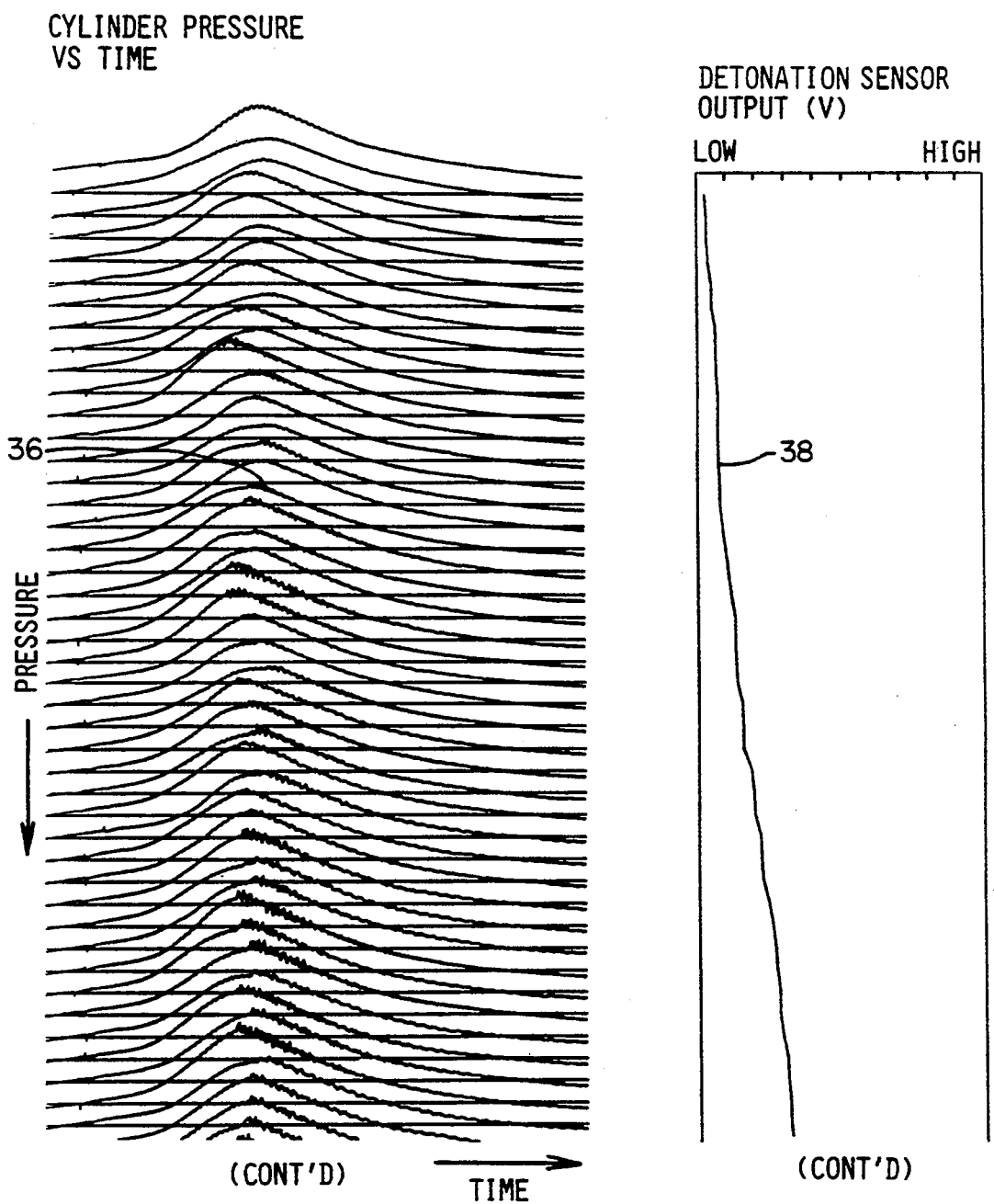
FIGS. 4A-4B are graphs showing the cylinder pressure during the compression and power strokes of a monitored engine cylinder in order of increasing detonation intensity.
FIGS. 5A-5B are graphs showing the increasing detonation detector output in response to the increasing detonation intensity of the monitored engine cylinder as shown in FIGS. 4A-4B.
Figures 4B, 5B:
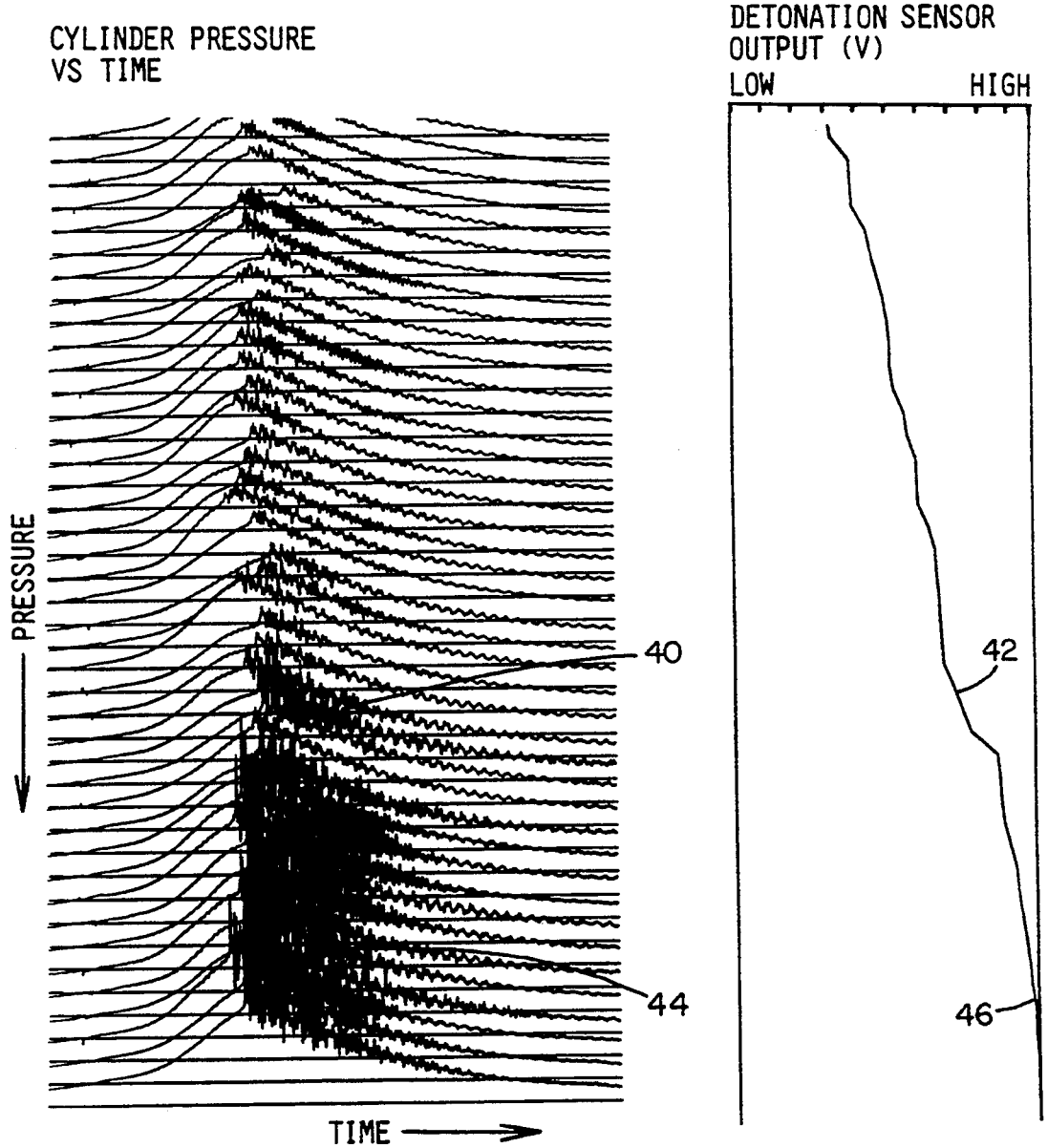

FIGS. 4A–4B are waveforms showing cylinder pressure vs. time in a monitored cylinder of a reciprocating spark ignited internal combustion engine plotted in order of increasing detonation intensity levels. The horizontal axis represents time and the vertical axis represents cylinder pressure. As can be seen in FIGS. 4A–4B, progressing down the vertical axis, the pressure traces show substantially increasing high frequency pressure fluctuations superimposed over the normal cylinder pressure rise and fall during the compression and power stroke of the cylinder. These increasing high frequency pressure fluctuations are a result of increasing detonation severity.

FIGS. 4A–4B should be viewed in conjunction with FIGS. 5A–5B, which show the output of detonation detector 10 in response to the increasing detonation intensity levels. The detonation detector output varies between 0 and 10 volts DC as shown along the horizontal axis. As can be seen in FIGS. 5A–5B, the output of detonation detector 10 increases as the severity of detonation increases. For example, in FIG. 4A, the pressure traces lying above the reference point 36 show the cylinder pressure during normal combustion. The pressure traces at and closely below reference point 36 show low level detonation occurring in the monitored cylinder. As can be seen at reference point 38 of FIG. 5A, the slope of the detonation detector output begins to increase at or close to point 38 corresponding to the onset of low level detonation. Progressing down the vertical axis and into FIGS. 4B and 5B, it can be seen that the high frequency pressure fluctuations are increasing as a result of increasing detonation severity. For example, the pressure traces near reference point 40 of FIG. 4B represent heavy detonation intensity levels, with reference point 42 of FIG. 5B showing a substantially increased detonation detector output in response to heavy detonation. Similarly, as is clearly evident, the pressure traces near reference point 44 demonstrate severe high frequency pressure fluctuations resulting from extreme detonation intensity levels. At these detonation levels, the output of detonation detector 10 is near its maximum, as shown at reference point 46 in FIG. 5B. Thus, in keeping with the present invention, detonation detector 10 is capable of detecting both audible and sub-audible detonation intensity levels. This is an important aspect of the present invention since prior art detonation detecting systems are not capable of efficiently and accurately distinguishing between low level detonation intensity and background noise.

Figure 6:
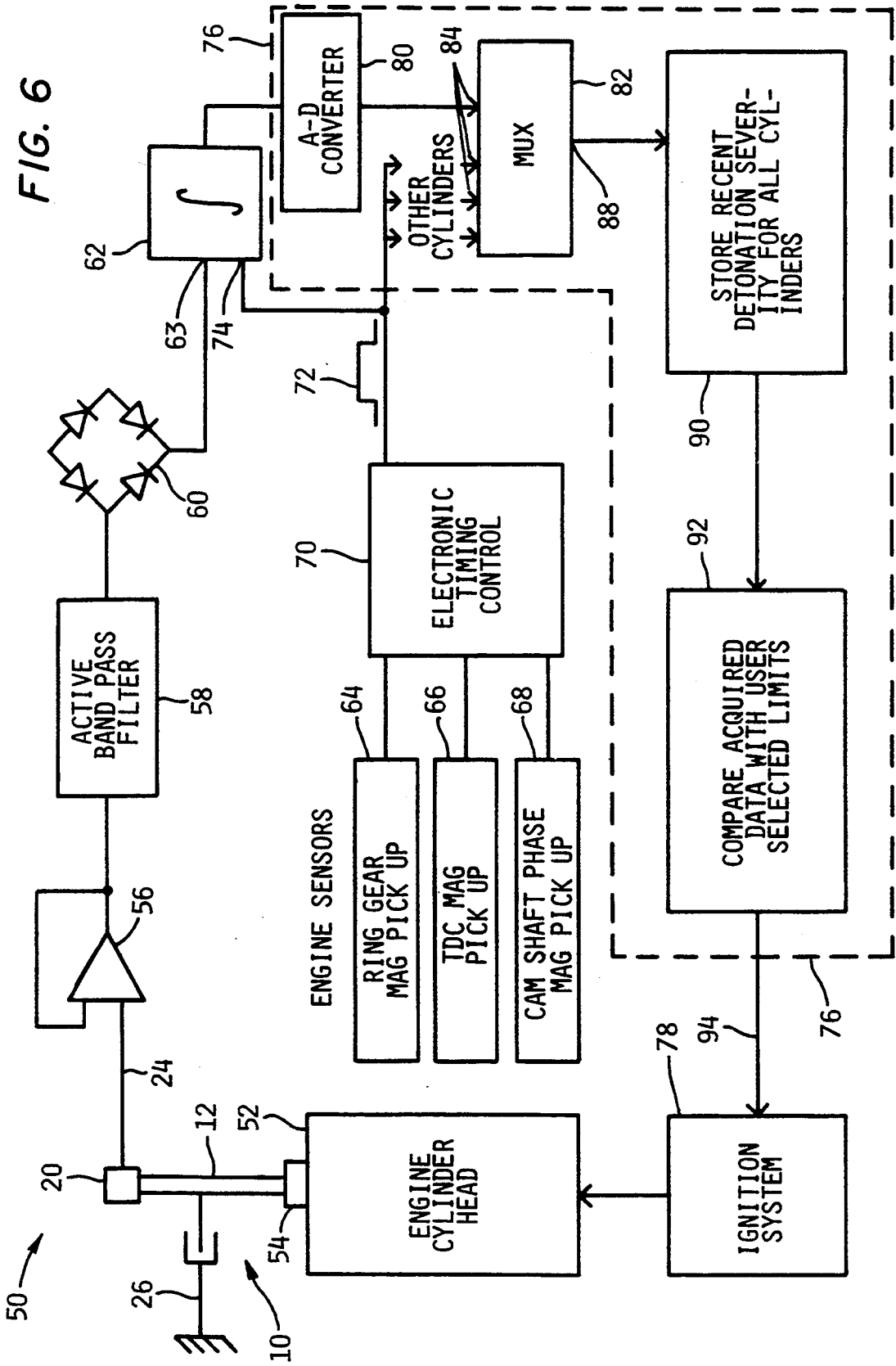
FIG. 6 is a schematic diagram illustrating the detonation detection system of the present invention.

In accordance with another aspect of the present invention, FIG. 6 is a schematic diagram illustrating a detonation detection system 50. In FIG. 6, detonation detection system 50 utilizes the detonation detector 10 of the preferred embodiment of the present invention as discussed above. Detonation detection system 50 is operable for detecting the intensity of detonation occurring in one or more combustion chambers of an internal combustion engine for every combustion cycle of the engine. In response to the occurrence of detonation, detonation detection system 50 provides a control signal to an engine controller associated with the engine to reduce the occurrence of detonation. For purposes of explanation, FIG. 6 shows only a single detonation detector 10 monitoring a single cylinder of an internal combustion engine. However, it should be understood that detonation detection system 50 can utilize any number of detonation detectors 10 to monitor any number of cylinders, and then provide control signals to the engine controller for reducing the occurrence of detonation in any particular cylinder of the engine.

In FIG. 6, an engine cylinder head 52 is shown with detonation detector 10 of the present invention mounted on a spark plug 54 associated with the engine cylinder head 52. As discussed previously, detonation detector 10 includes rod assembly 12 which acts as a mechanical filter to amplify detonation frequency signals and attenuate noise vibration signals. Accelerometer 20 is mounted to rod assembly 10 so that it is isolated from high engine temperatures. Dampener 26, which in the preferred embodiment comprises a spark plug wire, prevents rod assembly 12 from continuously resonating as discussed above.

The electrical output signals from accelerometer 20 feed through lead 24 to an amplifier 56. As discussed above, because a flat response accelerometer is used, the electrical output signals from accelerometer 20 are at relatively low levels. Accordingly, amplifier 56 is provided to amplify the electrical output signals from accelerometer 20. The output of amplifier 56 is connected to an active band pass filter 58 which operates to remove the noise signals resulting from normal combustion of the engine which were previously filtered by rod assembly 12. As a result, the output of band pass filter 58 consists only of a filtered signal relating to the detonation frequency signal substantially devoid of noise signals. Thus, in keeping with the present invention, detonation detector 10 in connection with amplifier 56 and band pass filter 58 detect and amplify the frequency of vibration signals resulting from detonation and also differentiate between low intensity detonation signals and engine noise signals.

The output from high pass filter 58 is passed through a full wave rectifier circuit 60 and then to an integrator 62 through an input 63. The integrator 62 integrates the filtered detonation frequency signal and provides a detonation output which is proportional to the intensity level of detonation. However, in order to provide additional assurance that detonation detection system 50 will only detect vibrations induced by detonation, integrator 62 is gated (or enabled) only during at least a portion of the engine power stroke associated with the particular cylinder being monitored. Thus, any noise or other vibration signals occurring during other strokes of the combustion cycle will not be detected, since integrator 62 is only activated during the power stroke of the engine or a portion thereof.

In order to activate integrator 62 during the engine power stroke or a portion thereof, a plurality of engine sensors are provided to determine the engine power stroke associated with the particular combustion chamber being monitored. In the exemplary embodiment shown in FIG. 6, the plurality of engine sensors include a ring gear magnetic pickup sensor 64, a top-dead-center (TDC) magnetic pickup sensor 66, and a cam shaft phase magnetic pickup sensor 68. The TDC magnetic pickup sensor 66 generates a single voltage pulse every crank shaft revolution, and resets the ring gear magnetic pickup sensor 64. The ring gear magnetic pickup sensor 64 senses crank shaft ring gear teeth, and provides several evenly spaced voltage pulses during a crankshaft revolution. These pulses are used to determine the crank shaft position at any given time by simply counting the voltage pulses. In order to avoid the effects of errors if an extra pulse is sensed or not enough pulses are sensed, the TDC sensor 66 resets the ring gear sensor 64 every crank shaft revolution. On a four cycle engine, the cam shaft phase magnetic pickup sensor 68 provides one voltage pulse for every two crank shaft revolutions to allow differentiation of the power stroke from the intake stroke and also the compression stroke from the exhaust stroke. The phase magnetic sensor 68 provides one voltage pulse per cam shaft revolution. The outputs of sensors 64, 66 and 68 are connected to an electronic timing control 70 which provides an integrate enable signal 72 to an input 74 of integrator 62 during the engine power stroke or a portion thereof.

The integrated detonation output signals are transmitted to a digital controller 76. Digital controller 76 stores the detonation output signals from integrator 62 and compares these signals with selected detonation limit values previously determined to be acceptable detonation limits. Digital controller 76 then compares the several most recent detonation output signals from a given cylinder with the selected detonation limit values, and if the detonation output signals exceed the limit values, controller 76 will generate a control signal to an ignition system 78 to take appropriate action to reduce the occurrence of detonation. For example, the control signal from digital controller 76 can command ignition system 78 to retard spark ignition timing to reduce or eliminate detonation. As an alternative to ignition system 78, the control signal can command and engine controller to reduce the revolutions per minute of the engine, decrease the throttle angle, decrease coolant temperature, reduce intake air temperature, or take any other appropriate action which eliminates or reduces the occurrence of detonation.

Digital controller 76, as shown in FIG. 6, includes an analog-to-digital converter 80 which converts the analog detonation output signals from integrator 62 to digital signals. These digital signals are transmitted to a multiplexer 82, which is utilized when more than one cylinder is being monitored for detonation. As shown in FIG. 6, multiplexer 82 includes inputs 84 from several cylinders which would all utilize the same detection system as described above in order to produce a detonation output signal for each monitored cylinder. Multiplexer 82 also has an output 88 which represents a detonation severity digital signal for each engine cylinder being monitored. The detonation severity signal is transmitted to a storage location 90 within digital controller 76 which stores a recent history of detonation severity signals for all monitored cylinders. Digital controller 76 also includes a comparison circuit 92 which compares the recent detonation severity signals stored in storage location 90 with selected detonation limit values which are also stored in digital controller 76. As stated above, if the detonation severity signals for a given cylinder exceed the selected detonation limit values, digital controller 76 will generate an output on lead 94 which, in the exemplary embodiment, will command ignition system 78 to retard the spark ignition timing and hence reduce or eliminate detonation in the particular cylinder.

As is evident from the foregoing description, a detonation detector is provided which is highly capable of detecting low intensity detonation signals and differentiating these low level signals from engine noise. Thus, the detonation detector of the present invention provides a filtered detonation output signal for a wide range of detonation intensity levels even during periods of random and increased mechanical vibrations. The detonation detector also isolates the accelerometer from high temperatures generated by the engine. Additionally, the detonation detector allows the use of a single flat response accelerometer for various engine models and sizes, with the detector being adaptable to these various engines by modifying the construction of the mechanical filter to tune the mechanical filter resonance to the characteristic detonation signal frequency of a particular engine. Finally, the detonation detection system of the present invention in conjunction with the present detonation detector provides additional assurance that only detonation signals are detected by actively detecting vibration signals only during the engine power stroke or a portion thereof.

We claim:

1. A detonation detector for detecting the intensity of detonation in a combustion chamber of an internal combustion engine, the detonation detector comprising:
   mechanical filter means mounted on the engine for detecting the frequency of vibration signals resulting from detonation, the filter means having a resonant frequency at about a characteristic frequency of detonation so that detonation signals at about the detonation frequency including low intensity detonation signals are amplified and engine noise signals are diminished;
   dampening means connected to the mechanical filter means for dampening vibrations of the mechanical filter means induced by engine operation in order to prevent the mechanical filter means from continuously resonating;
   a flat response accelerometer mounted on the mechanical filter means for receiving the engine noise signals and said detonation signals from the mechanical filter means and converting said engine noise signals and said detonation signals into electrical signals; and
   means for modifying the electrical signals from the accelerometer into detonation output signals indicative of detonation intensity levels, the modifying means including means for amplifying the electrical signals and means for filtering the engine noise signals so that the detonation output signals are substantially devoid of engine noise signals.

2. The detonation detector as set forth in claim 1 wherein the mechanical filter means comprises a cylindrical rod assembly having a first end mounted on the engine, the rod assembly being tuned to the resonant frequency at about the characteristic frequency of detonation.

3. The detonation detector as set forth in claim 2 wherein the engine is a reciprocating spark ignited internal combustion engine and wherein the rod assembly is mounted directly on a spark plug associated with the engine.

4. The detonation detector as set forth in claim 3 wherein the rod assembly comprises a metal rod portion, a thermoplastic rod portion, and a highly insulated spark plug wire portion.

5. The detonation detector as set forth in claim 4 wherein the metal rod portion is mounted on the spark plug and the accelerometer is mounted on the thermoplastic rod portion so that the accelerometer is isolated from the engine.

6. The detonation detector as set forth in claim 5 wherein the metal rod portion serves as an electrical conductor to pass electrical energy including high voltage spark ignition pulses from the spark plug wire portion to the spark plug.

7. The detonation detector as set forth in claim 6 wherein the thermoplastic rod portion isolates the accelerometer from the high voltage spark ignition pulses.

8. The detonation detector as set forth in claim 7 wherein the spark plug portion comprises the dampening means and dampens vibrations of the rod assembly in order to diminish said engine noise signals and to prevent the rod assembly from continuously resonating.

9. The detonation detector as set forth in claim 1 wherein the mechanical filter means comprises a cantilever beam tuned to the resonant frequency at about the characteristic frequency of detonation.

10. The detonation detector as set forth in claim 1 wherein the accelerometer is operable for sensing a range of detonation frequencies and includes a piezoelectric crystal responsive to the vibration signals resulting from detonation.

11. The detonation detector as set forth in claim 1 wherein the detonation detector detects both audible and sub-audible detonation signal intensity levels.

12. The detonation detector as set forth in claim 1 wherein the modifying means further includes means for rectifying the output signals and means for integrating the output signals to provide detonation output signals that are proportional to the intensity level of detonation.

13. A detonation detector for detecting the intensity of detonation occurring in a combustion chamber of an internal combustion engine, the detonation detector comprising:
   a cylindrical rod assembly having one end mounted on the engine near the combustion chamber for amplifying vibration signals resulting from detonation, the rod assembly being tuned to a resonant frequency at about a detonation frequency signal for attenuating engine noise signals and amplifying vibration signals at about the detonation frequency signal including low intensity detonation signals;
   dampening means connected to the cylindrical rod assembly for dampening vibrations of the cylindrical rod assembly induced by engine operation in order to prevent the cylindrical rod assembly from continuously resonating;
   a flat response accelerometer isolated from the engine by mounting on the cylindrical rod assembly, the accelerometer receiving the amplified detonation signals and the attenuated noise signals and converting said engine noise signals and said detonation signals into electrical output signals; and
   electronic circuit means connected to the accelerometer for amplifying the electrical output signals and filtering the attenuated noise signals to provide a detonation output indicative of detonation intensity levels.

14. The detonation detector as set forth in claim 13 wherein the engine is a reciprocating spark ignited internal combustion engine and wherein the cylindrical rod assembly is mounted directly on a spark plug associated with the engine.

15. The detonation detector as set forth in claim 14 wherein the rod assembly comprises a metal rod portion, a thermoplastic rod portion, and a highly insulated spark plug wire portion.

16. The detonation detector as set forth in claim 15 wherein the metal rod portion is mountable on the spark plug and the accelerometer is mountable on the thermoplastic rod portion so that the accelerometer is isolated from the engine.

17. The detonation detector as set forth in claim 16 wherein the metal rod portion serves as an electrical conductor to pass electrical energy including high voltage spark ignition pulses from the spark plug wire portion to the spark plug.

18. The detonation detector as set forth in claim 17 wherein the thermoplastic rod portion isolates the accelerometer from the high voltage spark ignition pulses.

19. The detonation detector as set forth in claim 18 wherein the spark plug portion comprises the dampening means and dampens vibrations of the rod assembly in order to attenuate said engine noise signals and to prevent the rod assembly from continuously resonating.

20. The detonation detector as set forth in claim 13 wherein the accelerometer senses a range of detonation frequencies and includes a piezoelectric crystal responsive to the vibration signals resulting from detonation.

21. The detonation detector as set forth in claim 13 wherein the detonation detector detects both audible and sub-audible detonation signal intensity levels.

22. A detonation detection system for detecting the intensity of detonation occurring in one or more combustion chambers of an internal combustion engine, the detonation detection system comprising, in combination:
 a highly-tuned detonation detector mounted near at least one of the combustion chambers including mechanical filter means having a resonant frequency at about a characteristic detonation frequency signal for detecting and amplifying vibration signals resulting from detonation, the detonation detector operable for differentiating between low intensity detonation signals and engine noise signals;
 electronic circuit means connected to the detonation detector for further amplifying the detonation signals and filtering the engine noise signals, the electronic circuit means providing filtered detonation signals substantially devoid of noise signals; and
 a gated integrator receiving the filtered detonation signals from the detonation detector and integrating the filtered signals to provide detonation output signals proportional to the intensity level of the detonation, the integrator only being activated during at least a portion of the engine power stroke to further prevent detection of vibration signals unrelated to detonation.

23. The detonation detection system as set forth in claim 22 further comprising digital control means for storing the detonation output signals from the gated integrator and comparing the detonation output signals with selected detonation limit values, the control means providing control signals to an engine controller associated with the engine to reduce the occurrence of detonation in the one or more combustion chambers when the detonation output signals exceed the selected detonation limit values.

24. The detonation detection system as set forth in claim 22 further comprising dampening means connected to the mechanical filter means for dampening vibrations of the mechanical filter means in order to prevent the mechanical filter means from continuously resonating.

25. The detonation detection system as set forth in claim 24 wherein the highly-tuned detonation detector comprises:
 a rod assembly comprising the mechanical filter means being tuned to a resonant frequency at about the characteristic detonation frequency signal for attenuating noise signals from the engine and amplifying signals at about the detonation frequency signal including low intensity detonation signals; and
 a flat response accelerometer isolated from the engine by mounting on the rod assembly, the accelerometer receiving the amplified detonation frequency signals and the attenuated noise signals and converting said signals into electrical output signals.

26. The detonation detection system as set forth in claim 25 wherein the engine comprises a reciprocating spark ignited internal combustion engine and wherein the rod assembly is mounted directly on a spark plug associated with the engine.

27. The detonation detection system as set forth in claim 26 wherein the rod assembly comprises a metal rod portion, a thermoplastic rod portion, and a highly insulated spark plug wire portion.

28. The detonation detection system as set forth in claim 25 wherein the flat response accelerometer is operable for sensing a range of detonation frequencies and includes a piezoelectric crystal responsive to vibration signals resulting from detonation.

29. The detonation detection system as set forth in claim 24 wherein the mechanical filter means comprises a cantilever beam tuned to the resonant frequency at about the characteristic frequency of detonation.

30. The detonation detection system as set forth in claim 22 wherein the highly-tuned detonation detector is operable for detecting both audible and sub-audible detonation intensity levels.

31. The detonation detection system as set forth in claim 22 further comprising an electronic engine timing circuit connected to a plurality of engine sensors for detecting the engine power stroke and providing an enable signal to activate the gated integrator only during the engine power stroke or a portion thereof.

* * * * *